United States Patent [19]
Fredriksson

[11] Patent Number: 5,775,754
[45] Date of Patent: Jul. 7, 1998

[54] CHAIN COUPLING DEVICE

[76] Inventor: Lars Olof Arne Fredriksson, Västerskärsringen 34, S-184 92, Åkersberga, Sweden

[21] Appl. No.: 771,037

[22] Filed: Dec. 20, 1996

[30] Foreign Application Priority Data

Dec. 22, 1995 [SE] Sweden .................. 9504635

[51] Int. Cl.[6] ...................................... B66C 1/12
[52] U.S. Cl. .......................... 294/82.11; 294/74
[58] Field of Search ................. 294/82.1, 82.11, 294/82.12, 74; 59/93; 24/116 R

[56] References Cited

U.S. PATENT DOCUMENTS

| | | | |
|---|---|---|---|
| 2,700,568 | 1/1955 | Meili | 294/82.12 |
| 2,835,528 | 5/1958 | McCarthy | 294/74 |
| 3,527,493 | 9/1970 | Phares | 294/74 |
| 4,060,269 | 11/1977 | Rieger et al. | 294/74 |
| 4,171,841 | 10/1979 | Rehbein. | |
| 4,264,097 | 4/1981 | Rehbein. | |
| 4,556,246 | 12/1985 | Millington. | |

*Primary Examiner*—Dean Kramer
*Attorney, Agent, or Firm*—Quarles & Brady

[57] ABSTRACT

A chain coupling device comprising a ring member adapted to be coupled to a hoisting mechanism, and a chain coupling mechanism adapted to be coupled to at least two hoisting chains (101, 201). The chain coupling mechanism comprises a unitary anchoring body (1) being made in one piece and being securable to the ring member. The unitary anchoring body has at least two pairs (6a, 6b; 7a, 7b) of anchoring projections, each pair of anchoring projections being provided with a detachable anchoring pin (6d, 7d) for anchoring an end link (102, 202) of an associated hoisting chain (101, 201) to the unitary anchoring body. The unitary anchoring body also has at least one pair (10a, 10b; 11a, 11b) of coupling projections being located at a distance from a corresponding pair of anchoring projections and being provided with seating surfaces for accommodating one (204) of the links of the associated hoisting chain.

12 Claims, 4 Drawing Sheets

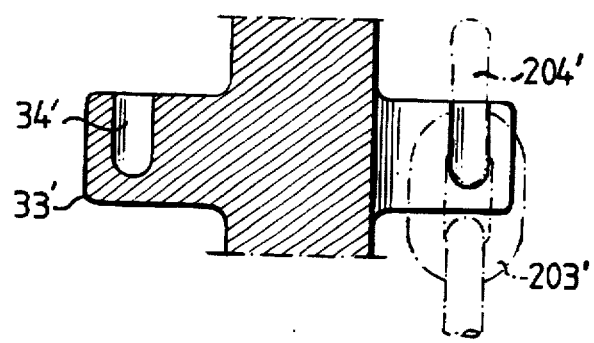
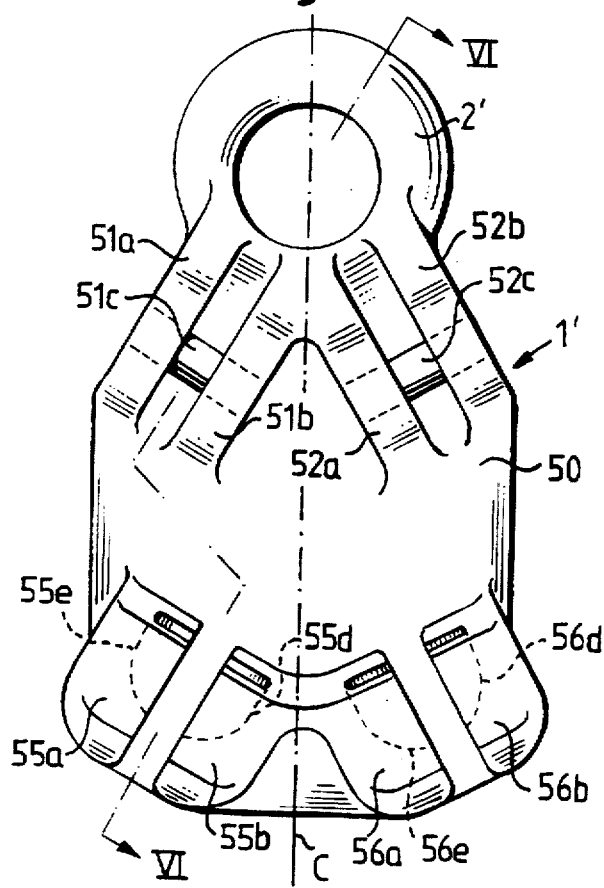
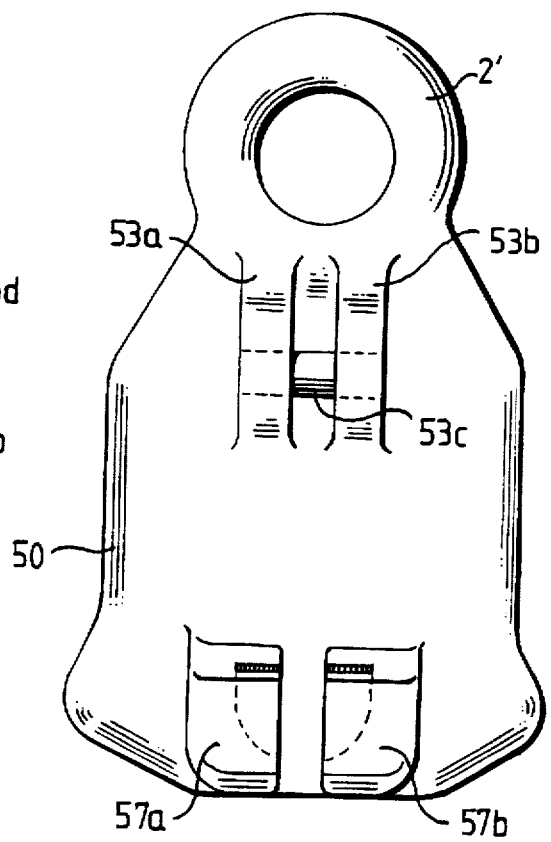

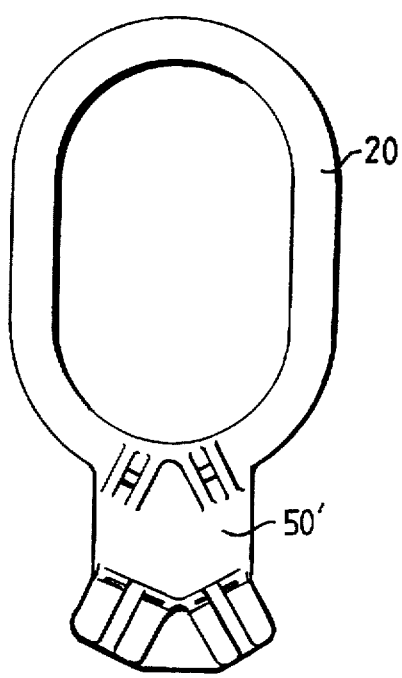
Fig. 7
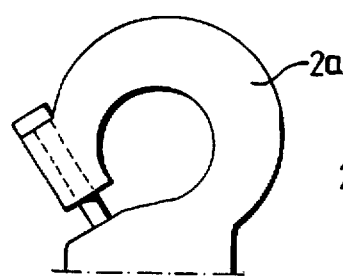
Fig. 8
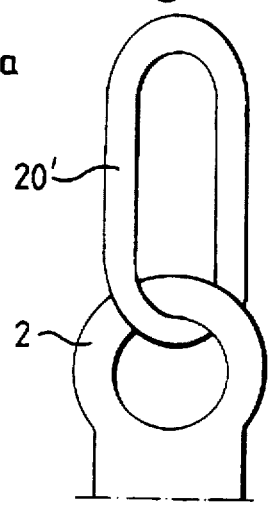
Fig. 9
Fig. 10
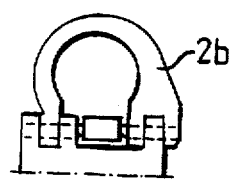
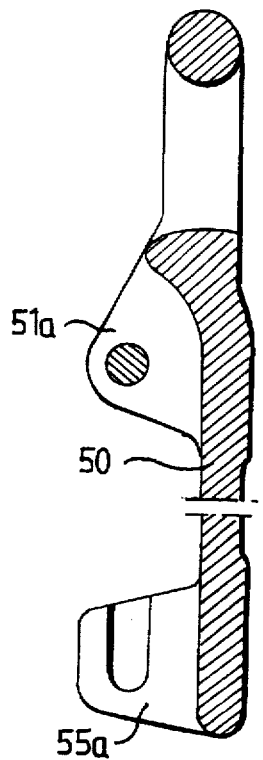
Fig. 6a
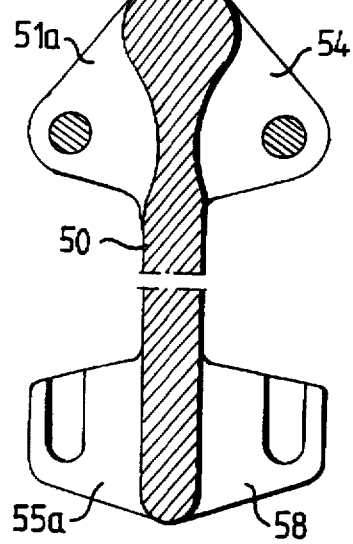
Fig. 6b
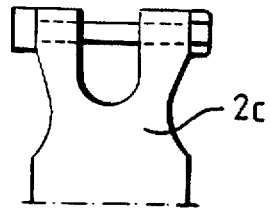
Fig. 11

CHAIN COUPLING DEVICE

FIELD OF THE INVENTION

The invention relates to a chain coupling device comprising a ring member adapted to be coupled to a hoisting means, such as a lifting hook, and a chain coupling means adapted to be coupled to at least two hoisting chains. The invention also concerns a chain coupling means in the form of an anchoring body.

When handling goods, in particular large or elongated objects, it is often desirable to couple two or more chain slings to a relatively large ring member or master link which in turn is hung onto a lifting hook hanging down from a crane or the like.

PRIOR ART

In a chain sling assembly known from EP-A-0092382, there are a large number of separate parts which are mutually connected to each other, viz. a main link, two hinged, separable connector links, four shackles (two of them connected to each connector link), and four shortening clutches (one clutch connected to each shackle). Thus, eleven separate parts are included in the assembly. In addition, each hinged connector link consists of two portions being connected by a pin. So, there are fifteen parts in the assembly for coupling one main link to four shortenable chain slings hanging down therefrom.

Of course, such a large number of parts will make the total assembly expensive, cumbersome to put together and relatively elongated with four or five parts in a row (the main link, two portions of the connector link, the shackle and the shortening clutch).

SUMMARY OF THE INVENTION

The main object of the invention is to provide a simpler and less expensive coupling device of the-kind mentioned in the first paragraph and having a small number of separate parts.

This object is achieved in that the chain coupling means comprises a unitary anchoring body being made in one piece and being directly secured to said ring member, said unitary anchoring body having at least two pairs of anchoring projections, each pair of anchoring projections being provided with a detachable anchoring pin for anchoring an end link of an associated hoisting chain to said unitary anchoring body, said unitary body also having at least one pair of coupling projections being located at a distance from a corresponding pair of anchoring projections and being provided with seating surfaces for accommodating one of the links of said associated hoisting chain.

With such a structure, the device will basically include two separate parts, viz. the ring member or main link and the unitary anchoring body (apart from the detachable pins being present in the previously known device as well).

At the anchoring body, there are two or more pairs of anchoring projections, viz. one pair for each hoisting chain, to be shortened at the anchoring body. So, according to the invention, at least one hoisting chain is connected with an end link to a pair of anchoring projections and coupled with another link to a pair of coupling projections, so as to form a non-loaded shortening chain loop therebetween, whereas at least one further hoisting chain is connected to another pair of anchoring projections.

It is conceivable to arrange three, four or even more pairs of anchoring projections at one and the same anchoring body so as to enable the connection of three or more hoisting chains to the anchoring body. At least one of these hoisting chains can be shortened by means of a corresponding pair of coupling projections. Of course, it is possible to provide a desired number of coupling projection pairs, less than or equal to the number of hoisting chains. Thus, all of the hoisting chains are securely anchored to the unitary anchoring body, and at least one, some or all of the hoisting chains are shortenable.

In order to permit a convenient anchoring of the various hoisting chains to the unitary anchoring body, the pairs of anchoring projections are preferably oriented in such a way that the different end links, which belong to the various hoisting chains and are anchored to the anchoring projection pairs, point away from each other, so that the adjoining chain sling portions or shortening loops do not interfere with one another. This can be accomplished by orienting the adjacent pairs of anchoring projections at an angle to each other.

Various embodiments of the chain coupling device according to the invention are defined in the claims and will appear from the detailed description below, reference being made to the appended drawings. In the claims, an anchoring body according to the invention is defined.

BRIEF DESCRIPTION OF THE DRAWINGS

FIG. 3f is a sectional view taken along the line IIIf—IIIf in FIG. 3e;

FIG. 4 is a front side view of a second embodiment of the anchoring body;

FIG. 5 is a rear side view of the anchoring body shown in FIG. 4 ;

FIG. 6a is a sectional view taken along the line VI—VI in FIG. 4;

FIG. 6b is a corresponding sectional view of a modified embodiment of the anchoring body shown in FIGS. 4 and 5;

FIG. 7 is a side view of an anchoring body of the kind shown in FIG. 4 but made in one piece with a closed ring member; and FIGS. 8–11 are partial side views of various modifications of the upper portion of the anchoring body to be secured to a ring member.

DETAILED DESCRIPTION OF PREFERRED EMBODIMENTS

Figure 1:
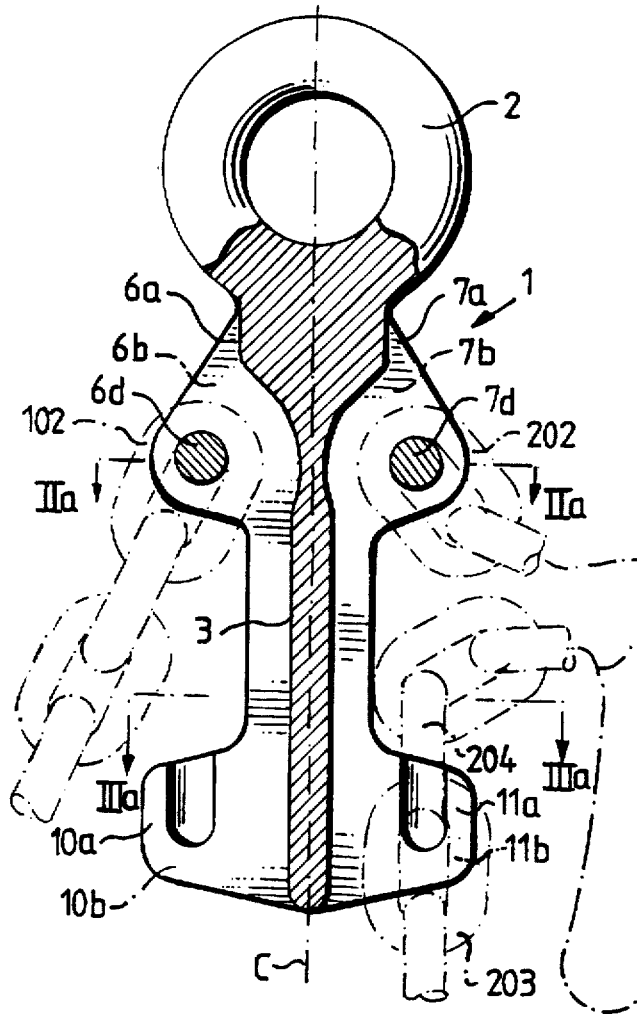
FIG. 1 is a sectional view of a first embodiment of an anchoring body included in a chain coupling device according to the invention.

FIGS. 1, 2, 2a and 3a illustrate a first embodiment of an anchoring body 1 intended to be permanently connected to a ring member (compare FIG. 9) so as to form a chain coupling device. In use, the ring member is hung onto a lifting hook or the like, and two chain slings 101, 201 are anchored to the anchoring body 1.

The anchoring body 1 is made in one piece of steel and comprises an upper eye 2 and, integrally therewith, a downwardly extending, substantially straight rod 3. In use, the rod 3 is oriented in a substantially vertical direction.

The cross-section of the rod 3 is basically rectangular (see FIG. 3a) with slightly bevelled corners and, on each longer side, a longitudinal groove 4 and 5, respectively, dimensioned to accommodate a portion of the links of the respective hoisting chain sling 101, 201. The width of the groove corresponds essentially to the material thickness of the hoisting chain links.

Adjacent to or slightly below the upper eye 2, the anchoring body 3 has two pairs of anchoring projections 6a, 6b and 7a, 7b extending laterally or radially outwardly from the longitudinal center line C in opposite directions, viz. the projections 6a, 6b to the left and the projections 7a, 7b to the right in FIG. 1 (compare also FIG. 2a). Each pair form a slot 6c, 7c between the substantially parallel projections, the slot constituting a radially outer extension of the respective groove 4, 5.

At each pair of anchoring projections, there is an anchoring pin 6d and 7d, respectively, extending transversely across the slot 6c, 7c. The end portions of the pins 6d, 7d are received in corresponding bore holes 8a, 8b and 9a, 9b, respectively, and are detachably secured in a manner known per se, e.g. by means of small locking pins (not shown) engaging with circumferential grooves in the anchoring pin and corresponding recesses adjoining the bore holes.

Figure 2:
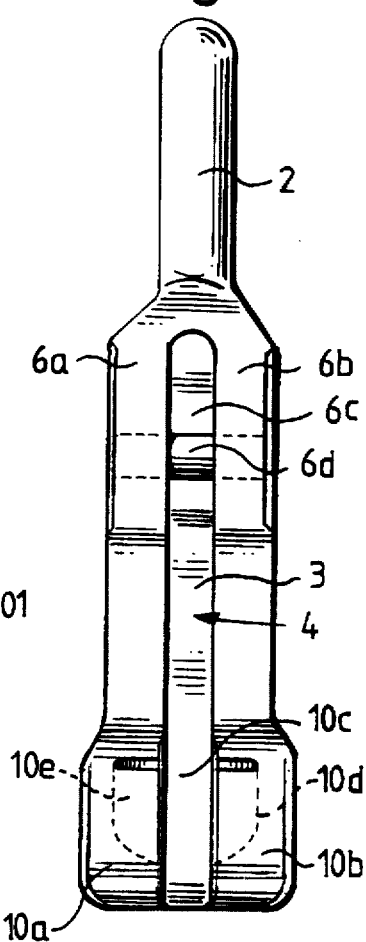
FIG. 2 is a side view of the anchoring body, as seen from the left FIG. 1.
Figure 2A:
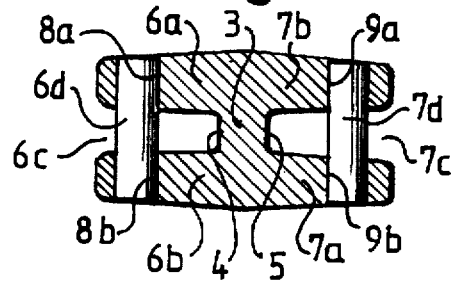
FIG. 2a is a sectional view taken along the line IIa—IIa in FIG. 1.

As indicated in FIG. 1, an end link 102 and 202, respectively, of each hoisting chain sling 101, 201 is secured or anchored to the respective anchoring body 1 on opposite sides thereof. Since the anchoring projections 6a, 6b and 7a, 7b are located on opposite sides of the rod 3 and are oriented in opposite directions, at an angle of 180°, the two hoisting chain slings 101, 201 can be conveniently handled independently of each other, without mutual interference.

At the bottom end portion of the rod 3, there are two pairs of laterally or radially extending coupling projections 10a, 10b and 11a, 11b, each pair being located vertically below the respective anchoring pair 6a, 6b and 7a, 7b and forming therebetween a slot 10c and 11c, respectively, in registry with each longitudinal groove 4, 5. Each slot 10c, 11c is wide enough to accommodate a flat-wise oriented chain link, such as the link 203 in FIG. 1, but also narrow enough to prevent the adjoining link 204 from passing through. In order to permit a well-defined positioning of the link 204 at the location shown in FIG. 1, the coupling projections are provided with recessed seating surfaces 10d, 10e and 11d, 11e having a geometrical shape corresponding to the external shape of the end portion of a chain link.

The portion of the chain sling 201 (to the right in FIG. 1) between the end link 202 and the link 204 engaging with the seating surfaces 11d, 11e forms a non-loaded shortening loop. By selecting a particular link 204, the effective length of the chain sling 201 hanging down from the anchoring body 1 can be adjusted as desired.

According to the invention, at least one pair of anchoring projections and a corresponding pair of coupling projections are located at a distance from each other. In the illustrated embodiment, both pairs of anchoring projections 6a, 6b and 7a, 7b have a corresponding pair of coupling projections 10a, 10b and 11a, 11b, whereby a shortening loop can be formed for each one of the two chain slings 101, 201.

Figure 2B:
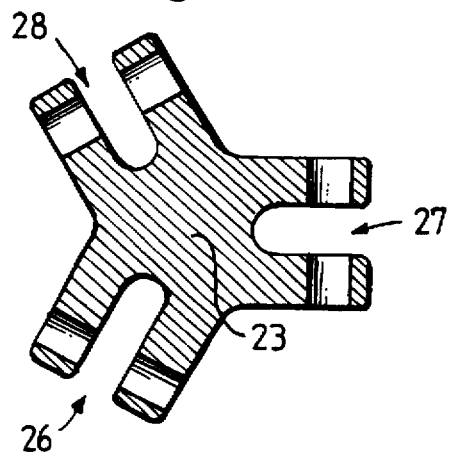
FIG. 2b is a corresponding sectional view of a first modified embodiment of the anchoring body.
Figure 3A:
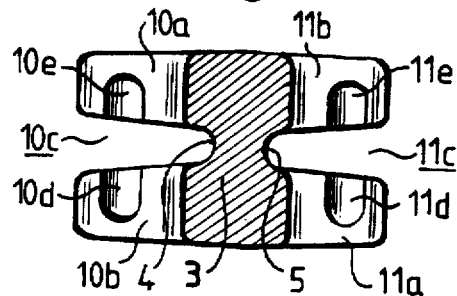
FIG. 3a is a sectional view taken along the line IIIa—IIIa in FIG. 1.
Figure 3B:
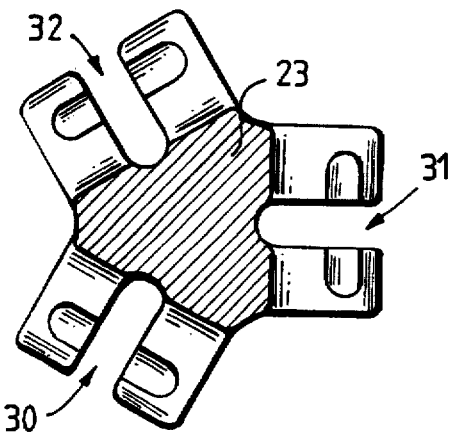
FIG. 3b is a corresponding sectional view of said first modified embodiment.

FIGS. 2b and 3b illustrate a modified embodiment with three pairs of anchoring projections 26, 27, 28 and corresponding coupling projections 30, 31, 32 extending radially in respective radial planes (corresponding to the lines IIa—IIa and IIIa—IIIa in FIG. 1) from a central rod 23 having a substantially triangular cross-section (see FIG. 3b).

Figure 2C:
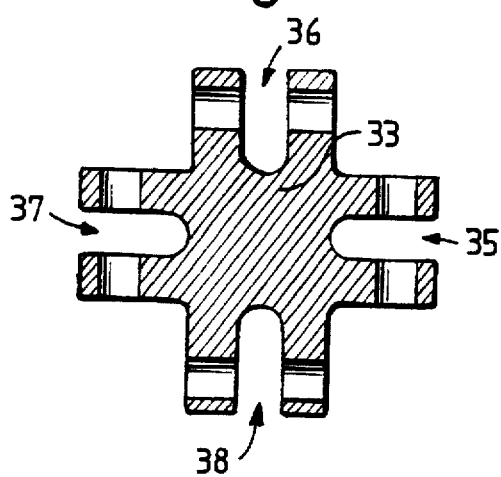
FIG. 2c is a corresponding sectional view of a second modified embodiment of the anchoring body.
Figure 3C:
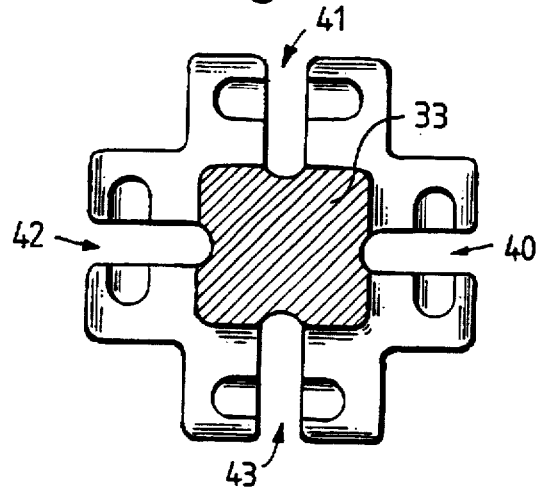
FIG. 3c is a corresponding sectional view of said second modified embodiment.

A similar modification with four anchoring projections 35, 36, 37, 38 and four corresponding coupling projections 40, 41, 42, 43 extending from a square rod 33 is shown in FIGS. 2c and 3c.

In the modified embodiments three or four chain slings, respectively, can be anchored to the anchoring body.

Figure 3D:
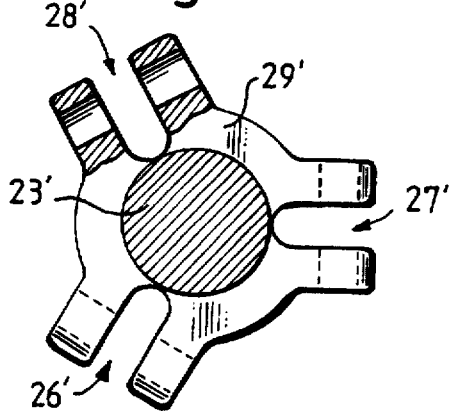
FIG. 3d and 3e are cross-sectional views of a third modified embodiment.
Figure 3E:
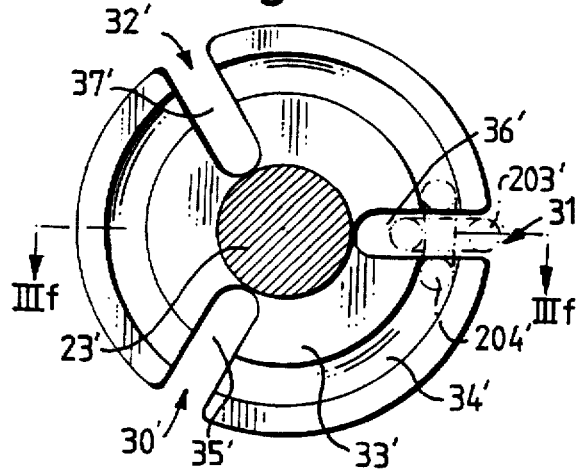

Another modified embodiment, with a central rod, three pairs of anchoring projections and three pairs of coupling projections, is illustrated in FIGS. 3d, 3e and 3f. The central rod 23' has a circular cross-section, as appears from FIGS. 3d and 3e. The anchoring projections 26', 27' and 28' are formed as extensions of a radial flange 29' extending circumferentially all around the central rod 23'. Accordingly, the three pairs of anchoring projections 26', 27', 28' are uniformly distributed in a first radial plane.

The cross-section in FIG. 3e is located at lower level than FIG. 3d, approximately corresponding to the line IIIa—IIIa in FIG. 1. At this level, there is a second radial flange 33' having a larger radius than the upper flange 29'. At a small distance from the outer edge of the flange 33', an annular groove 34' extends all around at the upper side thereof (compare also FIG. 3f).

In this case, the coupling projections 30', 31', 32' are constituted by portions of the radial flange 33' adjacent to three radial slots 35', 36' and 37' being uniformly distributed circumferentially.

Adjacent to each radial slot, the groove 34' provides seating surfaces for a chain link 204' adjoining a chain link 203' standing upright in the slot. Of course, the chain link 204' resting on the bottom of the groove 34' will only engage locally with the bottom edge at the respective sides of the radial slot. In order to provide a better seating surface, the last mentioned edges may be slightly bevelled.

A second embodiment, with an anchoring body 1' substantially in the form of a plate, is illustrated in FIGS. 4, 5, 6a and 6b.

The front side of the anchoring body 1' is shown in FIG. 4. The plate 50 is almost rectangular with obliquely inclined upper edge portions and slightly widened lower corner portions. The plate is rather wide-spread and accommodates, on the front side shown in FIG. 4, two upper pairs of anchoring projections 51a, 51b and 52a, 52b with anchoring pins 51c, 52c and two lower pairs of coupling projections 55a, 55b and 56a, 56b with recessed seating surfaces 55d, 55e and 56d, 55e.

The respective pairs of projections are located at the upper and lower portions of the plate but are oriented at inclined angles. In this way, the end links anchored to the respective anchoring pins 51c, 52c will be directed away from each other and away from the longitudinal center line C of the plate. So, the respective chain sling portion adjacent to the end link will be kept free and independent and will not interfere with the other chain sling portion.

The back side of the plate 50 may be smooth, without any projections, as shown in FIG. 6a, or it may be provided with a pair of anchoring projections 53a, 53b, with an anchoring pin 53c, and a corresponding pair of coupling projections 57a, 57b, as shown in FIG. 5. Alternatively, there may be two pairs of projections 54, 58 on the back side as well.

preferably arranged in the same configuration as on the front side, as indicated in FIG. 6b.

Two basic embodiments have been described above, with an anchoring body in the form of a rod or a plate. Those skilled in the art can find other structures based on the same concept with a unitary anchoring body having at least two pairs of anchoring projections and at least one pair of coupling projections.

An obvious modification is one where the anchoring projections are located at the lower end of the anchoring body, whereas the coupling projections are situated adjacent to the upper end thereof.

The upper end of the anchoring body 50' may be made in one integral piece with the ring member 20, as shown in FIG. 7, or be permanently connected with a closed ring member 20', as shown in FIG. 9. In the latter case, the ring member 20' is welded into a closed configuration at the time of manufacture.

As an alternative, the upper end portion 2a, 2b, 2c of the anchoring body (compare FIGS. 8, 10 and 11, respectively) may be designed for a secure but detachable connection to the ring member (not shown in FIGS. 8, 10, 11). It is also possible to couple the anchoring body to the ring member by means of a swivel connection.

I claim:

1. A chain coupling device comprising a ring member adapted to be coupled to a hoisting means, and a chain coupling means adapted to be coupled to at least two hoisting chains (101, 201), characterized in that said chain coupling means comprises a unitary anchoring body (1) being made in one piece and being secured to said ring member, said unitary anchoring body having at least two pairs (6a, 6b; 7a, 7b) of anchoring projections, each pair of anchoring projections being provided with a detachable anchoring pin (6d, 7d) for anchoring an end link (102, 202) of an associated hoisting chain (101, 201) to said unitary anchoring body, said unitary anchoring body also having at least one pair (10a, 10b; 11a, 11b) of coupling projections being located at a distance from a corresponding pair of anchoring projections and being provided with seating surfaces (10d, 10e, 11d, 11e) for accommodating one (204) of the links of said associated hoisting chain.

2. A chain coupling device as defined in claim 1, wherein said unitary anchoring body (50') and said ring member (20) are made in one piece.

3. A chain coupling device as defined in claim 1, wherein said unitary anchoring body (2) and said ring member (20') are permanently connected to each other.

4. A chain coupling device as defined in claim 1, wherein said unitary anchoring body (2a) is detachably connected to said ring member.

5. A chain coupling device as defined in claim 1, wherein the adjacent pairs of anchoring projections are oriented at an angle to each other.

6. A chain coupling device as defined in claim 1, wherein said unitary anchoring body (1') comprises a plate (50), said pairs of anchoring projections and said pairs of coupling projections being located on at least one side of said plate.

7. A chain coupling device as defined in claim 6, wherein at least one pair (51a, 51b; 53a, 53b) of anchoring projections and at least one pair (55a, 55b; 57a, 57b) of coupling projections are located on each side of said plate (50).

8. A chain coupling device as defined in claim 7, wherein two pairs (51a, 51b; 52a, 52b) of anchoring projections and two pairs (55a, 55b; 56a, 56b) of coupling projections are located on one side of said plate.

9. A chain coupling device as defined in claim 1, wherein said unitary anchoring body comprises a central, axially extending rod (3), said pairs (6a, 6b; 7a, 7b) of anchoring projections and said pairs (10a, 10b; 11a, 11b) of coupling projections extending substantially radially from said rod.

10. A chain coupling device as defined in claim 9, wherein said pairs (26', 27', 28') of anchoring projections and said pairs (30', 31', 32') of coupling projections are circumferentially distributed in first and second radial planes, respectively.

11. A chain coupling device as defined in claim 10, wherein said pairs (26', 27', 28') of anchoring projections are uniformly distributed in said first radial plane and said pairs (30', 31', 32') of coupling projections are uniformly distributed in said second radial plane.

12. A chain coupling means for use together with a ring member to be coupled to a hoisting means, said chain coupling means being adapted to be coupled to at least two hoisting chains (101, 102), characterized in that said chain coupling means comprises a unitary anchoring body (1) being made in one piece and being securable to said ring member, said unitary anchoring body having at least two pairs (6a, 6b; 7a, 7b) of anchoring projections, each pair of anchoring projections being provided with a detachable anchoring pin (6d, 7d) for anchoring an end link (102, 202) of an associated hoisting chain (101, 201) to said unitary anchoring body, said unitary anchoring body also having at least one pair (10a, 10b; 11a, 11b) of coupling projections being located at a distance from a corresponding pair of anchoring projections and being provided with seating surfaces (10d, 10e, 11d, 11e) for accommodating one (204) of the links of said associated hoisting chain.

* * * * *